(12) United States Patent
Kim et al.

(10) Patent No.: US 11,610,331 B2
(45) Date of Patent: Mar. 21, 2023

(54) METHOD AND APPARATUS FOR GENERATING DATA FOR ESTIMATING THREE-DIMENSIONAL (3D) POSE OF OBJECT INCLUDED IN INPUT IMAGE, AND PREDICTION MODEL FOR ESTIMATING 3D POSE OF OBJECT

(71) Applicants: NAVER CORPORATION, Gyeonggi-do (KR); LINE Corporation, Tokyo (JP)

(72) Inventors: Suntae Kim, Seongnam-si (KR); Dong Hyun Hwang, Seongnam-si (KR); Nicolas Monet, Seongnam-si (KR); Soonmin Bae, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 98 days.

(21) Appl. No.: 17/137,749

(22) Filed: Dec. 30, 2020

(65) Prior Publication Data

US 2021/0209788 A1 Jul. 8, 2021

(30) Foreign Application Priority Data

Jan. 3, 2020 (KR) .......................... 10-2020-0000699

(51) Int. Cl.
*G06T 7/70* (2017.01)
*G06T 7/73* (2017.01)
(Continued)

(52) U.S. Cl.
CPC .................. *G06T 7/73* (2017.01); *G06T 7/70* (2017.01); *G06T 13/40* (2013.01); *G06V 10/82* (2022.01);
(Continued)

(58) Field of Classification Search
CPC . G06T 7/70; G06T 13/40; G06T 2207/20081; G06T 2207/20224;
(Continued)

(56) References Cited

U.S. PATENT DOCUMENTS 8,355,529 B2 * 1/2013 Wu .......................... G06T 7/251
382/103
2014/0371907 A1 * 12/2014 Passot ...................... G06N 3/08
700/257

FOREIGN PATENT DOCUMENTS

JP 2000-194876 A 7/2000
JP 2001-126082 A 5/2001
(Continued)

OTHER PUBLICATIONS

Japanese Office Action dated Mar. 1, 2022 issued in corresponding Japanese Patent Application No. 2020-212564.
(Continued)

*Primary Examiner* — Jerome Grant, II
(74) *Attorney, Agent, or Firm* — Harness, Dickey & Pierce, P.L.C.

(57) ABSTRACT

Provided is a method of generating data for estimating a three-dimensional (3D) pose of an object included in an input image, the method including acquiring the input image including at least one moving object, estimating location information about each joint of a plurality of joints of the object included in the input image using a prediction model pretrained to estimate the location information about each joint of the plurality of joints of the object, and generating animation data that represents a movement of the object based on the estimated location information.

18 Claims, 11 Drawing Sheets

(51) Int. Cl.
*G06T 13/40* (2011.01)
*G06V 40/10* (2022.01)
*G06V 10/82* (2022.01)

(52) U.S. Cl.
CPC ............ *G06V 40/10* (2022.01); *G06V 40/103* (2022.01); *G06T 2207/20081* (2013.01); *G06T 2207/20224* (2013.01)

(58) Field of Classification Search
CPC . G06T 2207/10024; G06T 2207/20084; G06T 2207/30196; G06T 7/73; G06T 7/277; G06V 10/98; G06V 40/10; G06V 10/82; G06V 40/103
USPC ......................................................... 382/100
See application file for complete search history.

(56) References Cited

FOREIGN PATENT DOCUMENTS

| JP | 2003-058907 A | | 2/2003 | |
|---|---|---|---|---|
| JP | 2017-138915 A | | 8/2017 | |
| JP | 2021078715 | * | 5/2021 | .............. A61B 5/11 |
| KR | 10-1925879 B1 | | 2/2019 | |
| WO | WO2019111932 | * | 6/2019 | ............. G06V 40/23 |
| WO | WO-2019/167883 A1 | | 9/2019 | |

OTHER PUBLICATIONS

Takayoshi Yamashita, "Deep Learning Revised 2nd Edition", 2nd Edition, pp. 111-115 (2018).
Korean Office Action dated Apr. 6, 2021 issued in corresponding Korean Patent Application No. 10-2020-0000699.
Ji-Hoon Kang, et al. "3D Animation Contents Production System Using Skeleton Mapping," The Journal of Korean Institute of Information Technology. vol. 16. No. 8. pp. 73-81 (2018).
Gyeongsik Moon, et al. "Camera Distance-aware Top-down Approach for 3D Multi-person Pose Estimation from a Single RGB Image" ECE & ASRI, Seoul National University, Korea, pp. 1-15 (2019).
Feng Zhang, et al. "Fast Human Pose Estimation," University of Electronic Science and Technology of China, pp. 1-10 (2019).
Zhe Cao, et al. "OpenPose: Realtime Multi-Person 2D Pose Estimation using Part Affinity Fields," IEEE Transactions on Pattern Analysis and Machine Intelligence, vol. XXX, No. XXX, pp. 1-14 (2019).
Jeong, et al. "Joint Range Measurement and Correction using Kinect Camera," The Korean Society of Broad Engineers, http://www.dbpia.co.kr/journal/articleDetails?nodeId=NODE09301337, vol. 11, pp. 63-66 (2019).
Korean Office Action dated Oct. 18, 2021 issued in corresponding Korean Patent Application No. 10-2020-0000699.
Korean Office Action dated Dec. 14, 2022 issued in Korean Patent Application No. 10-2022-0090814.
Mehta, et al. "Vnect: Real-time 3D Human Pose Estimation with a Single RGB Camera," arXiv:1705.01583v1 [cs.CV] pp. 1:1-1:13(2017).

* cited by examiner

METHOD AND APPARATUS FOR GENERATING DATA FOR ESTIMATING THREE-DIMENSIONAL (3D) POSE OF OBJECT INCLUDED IN INPUT IMAGE, AND PREDICTION MODEL FOR ESTIMATING 3D POSE OF OBJECT

CROSS-REFERENCE TO RELATED APPLICATIONS

This U.S. non-provisional application and claims the benefit of priority under 35 U.S.C. § 119 to Korean Patent Application No. 10-2020-0000699, filed Jan. 3, 2020 the entire contents of which are incorporated herein by reference in their entirety.

BACKGROUND

Technical Field

One or more example embodiments relate to methods and/or apparatuses for estimating (predicting) a three-dimensional (3D) pose of an object included in an input image and a prediction model for estimating the 3D pose of the object, and more particularly, to methods and/or apparatuses that build a compressed prediction model for estimating a 3D pose of an object included in an input image captured using a red, green, blue (RGB) camera instead of using a sensing device, such as a depth camera, and generate data for estimating the 3D pose of the object in real time using the prediction model.

Related Art

There is an increasing interest in technology for estimating a three-dimensional (3D) pose of an object, such as a person included in an image captured or being captured in real time through a camera and mapping the estimated 3D pose to a virtual character. In particular, research on technology for estimating a 3D pose in an image using artificial intelligent (AI) technology, such as machine learning, an artificial neural network, and deep learning, is being actively conducted.

To estimate a 3D pose that represents a movement of an object included in an image, a variety of sensing data including depth information of an input image in addition to a two-dimensional (2D) input image (e.g., an image captured through an red, green, blue (RGB) camera) is required. To acquire sensing data, it is necessary to directly attach, to an object, sensor equipment such as an inertial measurement device or a marker that may be detected by a sensor. That is, relatively high cost is used to estimate a 3D pose of an object from an image and a movement of the object is limited due to attachment of sensor equipment. Therefore, a natural movement of the object and 3D pose estimation according thereto are also limited.

Accordingly, a 3D pose of an object included in an image may need to be estimated from only a 2D input image acquirable even from a general RGB camera attached to various devices, such as a laptop computer and a smartphone, without using expensive sensor equipment. In particular, to allow a device, such as a laptop computer or a smartphone, to immediately perform pose estimation in real time, there is a need for a method that may build a compressed prediction model, may generate data for estimating a 3D pose of an object using the prediction model, and may estimate the 3D pose.

The aforementioned information is merely provided to help understanding and may include the content that does not constitute a portion of the related art and may not include the content that the related art may present to those skilled in the art.

SUMMARY

Example embodiments may provide methods that may acquire an input image including an object, may estimate location information about each of a plurality of joints of the object using a prediction model pretrained to estimate location information about each of the plurality of joints of the object, and may generate animation data that representing a movement of the object based on the estimated location information.

Example embodiments may provide methods that may train a teacher model to estimate location information about a plurality of joints of an object included in a two-dimensional (2D) input image for training, may train a student model that is a further compressed model compared to the teacher model to learn the location information about the plurality of joints of the object included in the corresponding 2D input image for training based on a result of estimation by the teacher model, and may build the trained student model as a prediction model for estimating a three-dimensional (3D) pose of an object included in a 2D input image.

According to an aspect of at least one example embodiment, a method of generating data for estimating a 3D pose of an object included in an input image using a computer system, includes acquiring, using the computer system, an input image including at least one moving object, estimating, using the computer system, location information about each joint of a plurality of joints of the object included in the input image using a prediction model pretrained to estimate the location information about each of the plurality of joints of the object, and generating, using the computer system, animation data that represents a movement of the object based on the estimated location information.

The prediction model may be trained using a teacher model pretrained to estimate, from a desired training image, location information about a plurality of joints of an object included in the training image. The prediction model may be a further compressed model compared to the teacher model. The prediction model may learn the location information about the plurality of joints of the object included in the input image by using the estimated location information about the plurality of joints of the object included in the input image through the teacher model for calculation of a loss function.

The method may further include generating a virtual character that mimics the movement of the object by mapping the plurality of joints to the virtual character based on the animation data.

The estimating the location information may include generating a heat map and a location map for each joint of the plurality of joints, and estimating 3D coordinate information about each joint as the location information based on the heat map and the location map, the heat map may represent a likelihood that each joint is present at each pixel location in the heat map, and the location map may include information that represents a location in an x-axial direction, information that represents a location in a y-axial direction, and information that represents a location in a z-axial direction for each joint.

The method may further include determining erroneously estimated location information in the estimated location information, and correcting the erroneously estimated location information.

The method may further include determining whether a value on the heat map for each joint corresponding to the 3D coordinate information about each joint is less than a threshold, determining that the 3D coordinate information is erroneously estimated in response to the value on the heat map corresponding to the 3D coordinate information being less than the threshold, and correcting the 3D coordinate information that is determined to be erroneously estimated.

The estimated location information may include 3D coordinate information about each of the plurality of joints, and the animation data may include 3D location information about each joint based on the 3D coordinate information and rotation information about each joint based on 3D coordinate information that is continuously estimated for each joint.

The method may further include determining whether rotation information that represents an abnormal rotation state is present in the rotation information about each joint, and correcting the rotation information determined to represent the abnormal rotation state.

The determining may include determining that the rotation information represents the abnormal rotation state in response to the rotation information about each joint being out of a range of a preset angle corresponding to a normal movement of the object.

The method may further include calculating global location information that represents a global location of the object based on a focal distance of a camera used to capture the input image and specific location information estimated for at least one of the plurality of joints. A location movement of the object in the input image may be estimated based on the global location information.

The method may further include generating a confidence map associated with a plurality of objects included in the input image, the confidence map including vector information associated with each joint of a plurality of joints of each of the plurality of objects. The estimating the location information may include estimating the location information about each joint of the plurality of joints of each object to be distinguished from that of another object, among the plurality of objects, using the confidence map.

The generating the virtual character may include generating a plurality of virtual characters that respectively mimic movements of a plurality of objects included in the input image by mapping a plurality of joints of each of the plurality of objects to each of the plurality of virtual characters based on the animation data, and each of the generated plurality of virtual characters may be arranged at a different location of an output image output from a user terminal.

The acquiring may include a partial image that includes a single object among a plurality of objects in the input image, and the estimating and the generating may be performed in parallel or sequentially with respect to the partial image.

The generating the virtual character may include generating a plurality of virtual characters that respectively mimic movements of a plurality of objects included in the input image by mapping a plurality of joints of each of the plurality of objects to a corresponding virtual character, and each of the generated plurality of virtual characters may be arranged at a location determined according to a manipulation by a user of a user terminal on the user terminal.

According to another aspect of at least one example embodiment, a computer system for generating data for estimating a 3D pose of an object included in an input image includes at least one processor configured to execute computer-readable instruction. The at least one processor is configured to acquire the input image including at least one moving object, estimate location information about each joint of a plurality of joints of the object included in the input image using a prediction model pretrained to estimate the location information about each of the plurality of joints of the object, and generate animation data that represents a movement of the object based on the estimated location information.

According to still another aspect of at least one example embodiment, a method of building a prediction model for estimating a 3D pose of an object included in an input image using a computer system, includes training, using the computer system; a teacher model to estimate location information about a plurality of joints of a training object included in a training image, training, using the computer system, a student model of the teacher model that is a further compressed model compared to the teacher model to learn location information about the plurality of joints of the object included in the training image based on the estimated location information about the plurality of joints of the object included in the training image through the teacher model, and building, using the computer system, the trained student model as the prediction model for estimating the 3D pose of the object included in the input image.

The training the student model may include training the student model using a first loss function and a second loss function. The first loss function may be calculated based on a difference between a first heat map for each joint of the plurality of joints estimated by the student model and a second heat map corresponding to ground truth for each joint and a difference between the first heat map and a third heat map for each joint estimated by the teacher model. The second loss function may be calculated based on a difference between a first location map for each joint estimated by the student model and a second location map corresponding to ground truth for each joint and a difference between the first location map and a third location map for each joint estimated by the teacher model.

The difference between the first heat map and the second heat map and the difference between the first heat map and the third heat map may be included in the first loss function with a first mixture ratio, and the difference between the first location map and the second location map and the difference between the first location map and the third location map may be included in the second loss function with a second mixture ratio.

According to some example embodiments, without using an image captured from expensive sensor equipment or sensing data such as depth information, it is possible to estimate location information about each of a plurality of joints of an object included in a 2D input image and to estimate a 3D pose that represents a movement of the corresponding object in real time. It is possible to improve accuracy in pose estimation through postprocessing of the estimated location information and postprocessing of animation data that represents the movement of the object.

According to some example embodiments, it is possible to improve the estimation accuracy and to also achieve the compression of a prediction model mountable to a mobile terminal by building the prediction model for estimating a 3D pose of an object included in a 2D input image using a student model that is trained based on a result of estimating location information about a plurality of joints of an object included in an input image through a pretrained teacher model.

Further areas of applicability will become apparent from the description provided herein. The description and specific examples in this summary are intended for purposes of illustration only and are not intended to limit the scope of the present disclosure.

DETAILED DESCRIPTION

Figure 1:
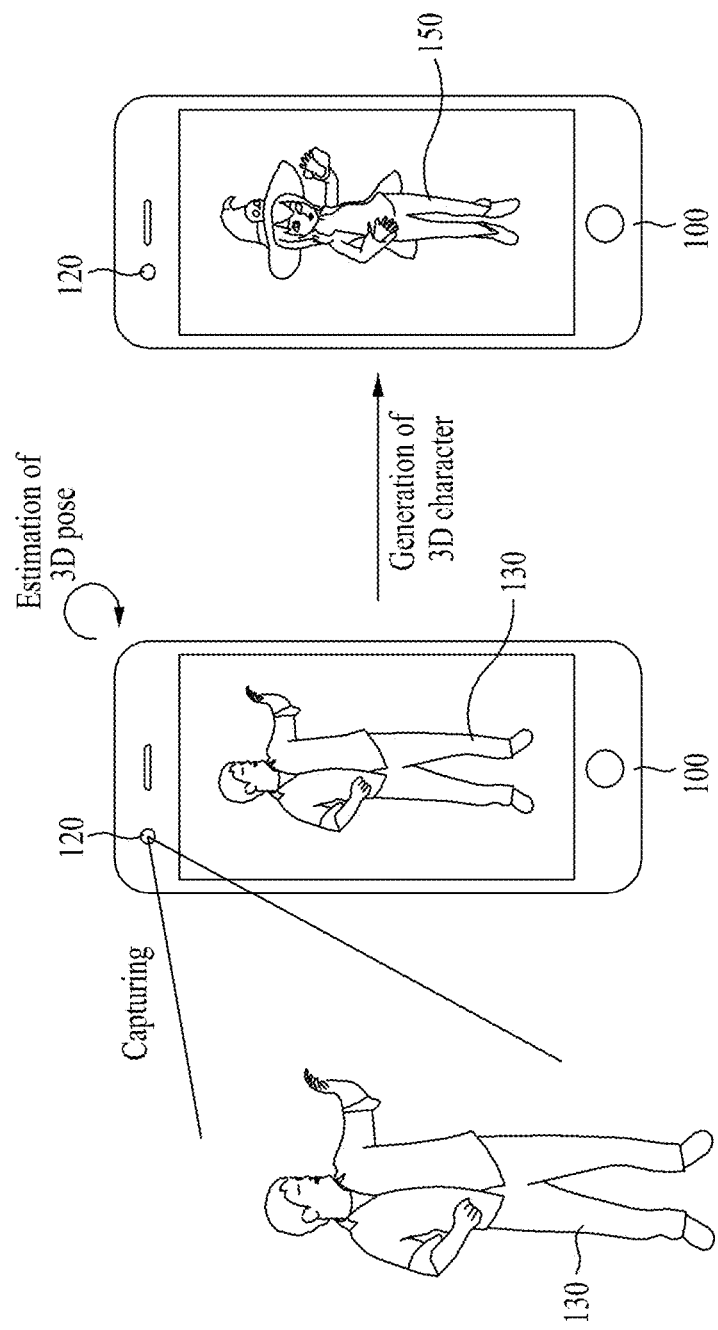
FIG. 1 illustrates an example of a method of estimating a three-dimensional (3D) pose of an object included in a two-dimensional (2D) input image according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device, however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Various modifications may be made to the example embodiments and specific example embodiments will be described in the detailed description with reference to the accompanying drawings. The effect and features of the disclosure and methods for achieving the same may become clear by referring to the following example embodiments, described with reference to the drawings. However, the present disclosure is not limited to the following example embodiments and may be implemented in various forms.

Hereinafter, example embodiments will be described with reference to the accompanying drawings. Like reference numerals refer to like component through, although they are illustrated in different drawings.

FIG. 1 illustrates an example of a method of estimating a three-dimensional (3D) pose of an object included in a two-dimensional (2D) input image according to at least one example embodiment.

Hereinafter, a method of estimating a 3D pose that represents a movement of an object 130 captured through a camera 120 and generating a virtual character 150 corresponding to the estimated 3D pose of the object 130 (e.g., the virtual character 150 that represents a 3D movement) is described with reference to FIG. 1. The virtual character 150 may be, for example, an avatar.

A computer system 100 may acquire an input image captured from the object 130. The acquired input image may be a 2D input image that is captured through, for example, a monocular red, green, blue (RGB) camera. The 2D input image may be an image that does not include depth information about the object 130.

The object 130 may correspond to a subject of the camera 120 having captured the input image, for example, a person moving in the input image.

Referring to FIG. 1, the input image of the object 130 may be captured by the camera 120 included in the computer system 100. In some example embodiments, the input image of the object 130, as an image captured by another camera aside from the camera 120, may be prestored in the computer system 100 or may be transmitted from another device or a server to the computer system 100 and thereby acquired by computer system 100. Here, such input image acquisition of the computer system 100 may relate to loading an input image file corresponding to the input image.

The computer system 100 may refer to a computer system that includes a prediction model for estimating a 3D pose that represents a movement of the object 130 from the input image of the object 130. The computer system 100 may estimate location information about joint(s) included in the object 130 using the prediction model and may generate animation data corresponding to the 3D pose of the object 130 based on the location information. The computer system 100 may generate the 3D virtual character 150 that mimics the movement of the object 130 by mapping the generated animation data to the virtual character 150.

For example, the computer system 100 may capture the object 130 using the camera 120, may estimate a 3D pose of the object 130 from an input image of the object 130 acquired in real time according to capturing, and may generate the 3D virtual character 150 corresponding thereto. That is, the computer system 100 may generate the 3D virtual character 150 that mimics the movement of the object 130 captured using the camera 120 in real time.

The computer system 100 may overlappingly display the object 130 included in the input image and the generated virtual character 150 (e.g., such that the virtual character 150 may be an upper layer than the object 130 or may be present ahead of the object 130), or may display only the virtual character 150 without displaying the object 130. In some example embodiments, the computer system 100 may separately display the object 130 and the virtual character 150 on different areas of a display at the same time.

Depending on example embodiments, it is possible to estimate a 3D pose of the object 130 by estimating location information about joint(s) of the object 130 in real time from the 2D input image captured from the object 130 using a compressed prediction model mounted to the computer system 100. Therefore, the computer system 100 may generate and display the virtual character 150 that mimics the movement of the object 130.

Hereinafter, a method of estimating a 3D pose of the object 130 from the 2D input image and a method of building the prediction model for estimating location information about joint(s) of the object 130 are further described with reference to FIGS. 2 to 12.

Figure 2:
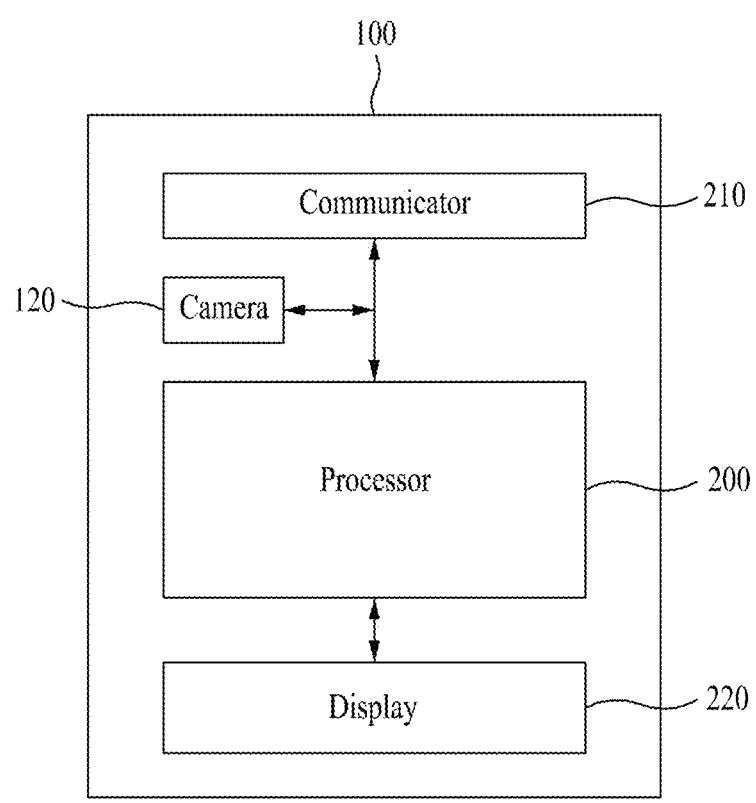
FIGS. 2 and 3 are diagrams illustrating examples of a computer system configured to estimate a 3D pose of an object included in a 2D input image according to at least one example embodiment.
Figure 3:
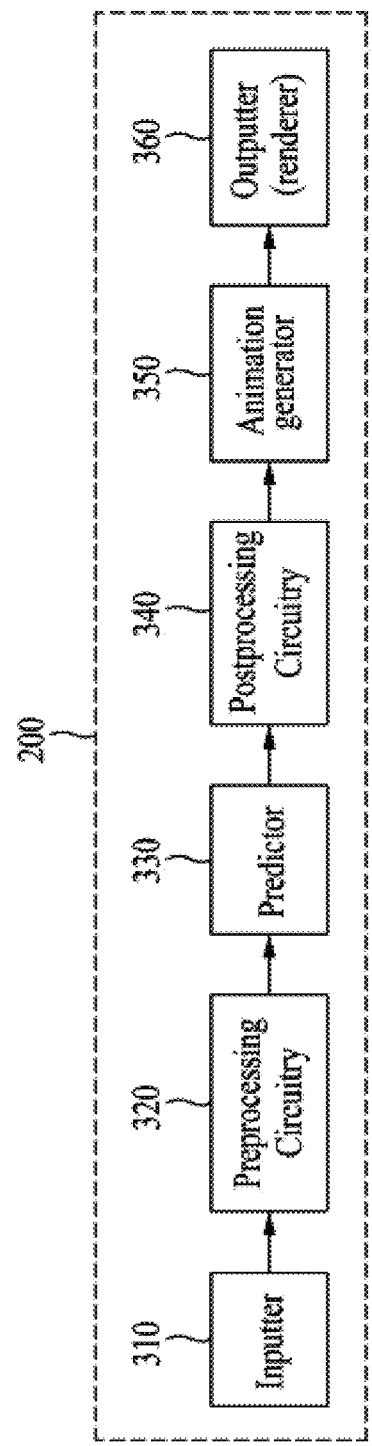

FIGS. 2 and 3 are diagrams illustrating examples of a computer system configured to estimate a 3D pose of an object included in a 2D input image according to at least one example embodiment.

The computer system 100 of FIG. 2 may correspond to the aforementioned computer system 100 of FIG. 1. That is, the computer system 100, as an electronic device that includes a compressed prediction model, may acquire a 2D input image captured from the object 130, may estimate location information about joint(s) of the object 130 using the prediction model, and may generate the virtual character 150 that mimics the movement of the object 130 by estimating a 3D pose of the object 130.

The computer system 100 may include, for example, a personal computer (PC), a laptop computer, a smart phone, a tablet, a wearable computer, an Internet of Things (IoT) device, and the like.

The computer system 100 may include a communicator 210 and a processor 200. Also, the computer system 100 may further include a display 220. Also, the computer system 100 may further include the aforementioned camera 120.

The communicator 210 may refer to a device for communication between the computer system 100 and another server or another device. That is, the communicator 210 may be a hardware module, such as, for example, a network interface card, a network interface chip, and a networking interface port of the computer system, or a software module, such as, for example, a network device driver or a networking program, configured to transmit/receive data and/or information to/from the other server or the other device. For example, the communicator 210 may receive an input image of the object 130 from the other server or the other device.

The processor 200 may manage components of the computer system 100 and may execute a program or an application used by the computer system 100. For example, the processor 200 may acquire the input image of the object 130, may estimate location information about joint(s) of the object 130 from the input image through the prediction model, and may generate the virtual character 150 that mimics the movement of the object 130 by estimating a 3D pose of the object 130. Also, the processor 200 may process an operation necessary for execution of a program or an application required to perform the operation and for processing of data. The processor 200 may be at least one processor of the computer system 100 or may be at least one core within the processor.

Although not illustrated, the computer system 100 may include a memory. The memory refers to a computer-readable record medium and may include a permanent mass storage device, such as, for example, random access memory (RAM), read only memory (ROM), and disc drive. Here, ROM and the permanent mass storage device may be included as a separate permanent storage device separate from the memory. An operating system (OS) and at least one program code may be stored in the memory. Such software components may be loaded from a computer-readable storage medium separate from the memory. The separate computer-readable storage medium may include computer-readable storage medium, such as, for example, a floppy drive, a disc, a tape, DVD/CD-ROM drive, and a memory card. According to other example embodiments, the software components may be loaded to the memory through the communicator 210 instead of the computer-readable storage medium. The memory may store data that constitutes the prediction model for estimating location information about joint(s) of the object 130 from the input image. Also, the memory may store the input image that includes the object 130.

The processor 200 may be configured to process an instruction of a computer program by performing basic arithmetic operations, logic operations, and input/output (I/O) operations. The instruction may be provided to the processor 200 through the memory or the communicator 210. For example, the processor 200 may be configured to execute the instruction received according to the program code loaded to the memory. Through the operation by the processor 200, the computer system 100 may perform the aforementioned operations of estimating the 3D pose of the object 130 and generating the virtual character 150.

A configuration of the processor 200 is further described with reference to FIG. 3. Each of components of the processor 200 may be configured as a hardware module or a combination of a software module and a hardware module as a portion of the processor 200 and may correspond to a function (a functional block) implemented by the processor 200.

The display 220 may refer to a device configured to display an input image that includes the object 130 or to display the virtual character 150 that is generated according to 3D pose estimation. Also, the display 220 may include a touch screen or a touch panel. Here, the display 220 may be configured to include a function of an inputter (not shown) configured to receive a user interaction that includes a touch input.

The camera 120 may generate image data about a subject by capturing the subject. For example, the camera 120 may generate 2D image data about the object 130 by capturing the object 130. The camera 120 may be an RGB camera.

A configuration of the processor 200 is further described with reference to FIG. 3.

Referring to FIG. 3, the processor 200 may include an inputter 310, a preprocessing circuitry 320, a predictor 330, a postprocessing circuitry 340, an animation generator 350, and an outputter 360.

The inputter 310 may be configured to acquire a 2D input image that includes at least one moving object 130. For example, the inputter 310 may acquire an input image of the object 130 captured through the camera 120 or may acquire an input image of the object 130 prestored in the computer system 100. Alternatively, the inputter 310 may acquire an input image of the object 130 received through the communicator 210.

The preprocessing circuitry 320 may be configured to process the acquired input image of the object 130 to a form suitable for being used by the prediction model. For example, the preprocessing 320 may change a size of the acquired input image of the object 130 to be a suitable size as an input to the prediction model (e.g., through crop). The preprocessing circuitry 320 may be configured to remove, from the acquired input image, a portion undesirable for the prediction model to estimate location information about a joint of the object 130.

The predictor 330 may be configured to estimate location information about each of a plurality of joints of the object 130 using the prediction model by using the input image processed through the preprocessing circuitry 320 as an input. The prediction model, as a compressed model to be mountable to a mobile terminal, may be a model named, for example, MoVNect model. The prediction model may be pretrained to estimate location information about each of the plurality of joints of the object 130 from the input image. That is, the predictor 330 may estimate location information about each of the plurality of joints of the object 130 included in the input image (processed through the preprocessing circuitry 320) using the prediction model that is pretrained to estimate the location information about each of the plurality of joints of the object 130. The prediction model and a method of building the prediction model are further described with reference to FIGS. 8 to 10.

Animation data that represents a movement of the object 130, that is, a 3D pose of the object 130 may be generated based on the location information estimated by the predictor 330.

The postprocessing circuitry 340 may be configured to correct a result of prediction by the predictor 330, that is, the estimated location information. Animation data that further accurately represents a 3D pose of the object 130 included in the input image may be generated according to correction by the postprocessing circuitry 340.

The animation generator 350 may be configured to generate animation data that represents a movement, that is, a 3D pose of the object 130 based on the location information estimated by the predictor 330 and the location information corrected by the postprocessing circuitry 340. The animation generator 350 may generate animation data that includes rotation information about each joint of the object 130 based on consecutive location information estimated from the object 130.

The outputter (renderer) 360 may be configured to apply (retarget) the animation data generated for the virtual character 150. For example, the outputter 360 may generate the virtual character 150 that mimics the 3D pose of the object 130 by mapping animation data about each joint of the object 130 to a corresponding joint of the virtual character 150.

The generated virtual character 150 may be output through the display 220. The generated virtual character 150 may mimic a movement, that is, a 3D pose of the object 130 captured in real time or almost in real time.

Further description related to function and operations of the components of the processor 200 is made with reference to FIGS. 4 to 12.

The description related to technical features made above with reference to FIG. 1 may apply alike to FIGS. 2 and 3 and thus, further description is omitted.

In the following description, an operation performed by components of the computer system 100 or the processor 200 or an operation performed by an application/program executed by the computer system 100 or the processor 200 may be described as an operation performed by the computer system 100, which is for clarity of description.

Figure 4:
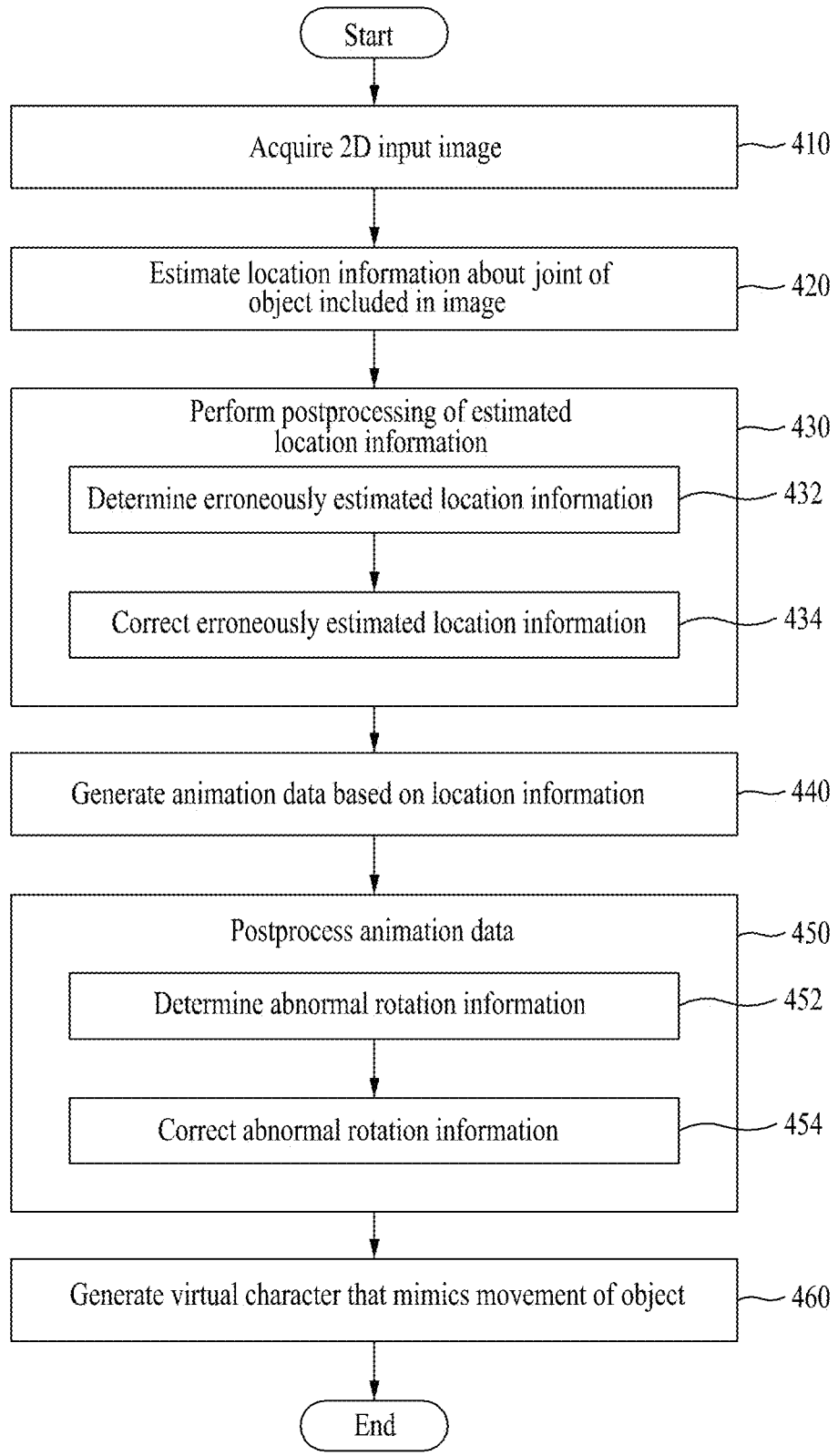
FIG. 4 is a flowchart illustrating an example of a method of generating data for estimating a 3D pose of an object included in a 2D input image according to at least one example embodiment.

FIG. 4 is a flowchart illustrating an example of a method of generating data for estimating a 3D pose of an object included in a 2D input image according to at least one example embodiment.

Referring to FIG. 4, in operation 410, the computer system 100 or the inputter 310 may acquire a 2D input image that includes at least one moving object 130. As described above, the computer system 100 may acquire an input image of the object 130 captured through the camera 120 or may acquire a prestored input image of the object 130. Alternatively, the computer system 100 may acquire an input image of the object 130 that is received through the communicator 210.

In operation 420, the computer system 100 or the predictor 330 may estimate location information about each of a plurality of joints of the object 130 included in the input image using a prediction model pretrained to estimate location information about each of the plurality of joints of the object 130. As described above, before performing operation 420, the input image of the object 130 may be processed to a further suitable form as an input to the prediction model by the preprocessing circuitry 320.

The plurality of joints of the object 130 may include, for example, 15 joints included in a person, as major joints that constitute the person. For example, the joints may include a head ('Head'), a neck ('Neck'), a right shoulder ('RightShoulder'), a right elbow ('RightElbow'), a right wrist ('RightWrist'), a left shoulder ('LeftShoulder'), a left elbow ('LeftElbow'), a left wrist ('LeftWrist'), a right hip ('RightHip'), a right knee ('RightKnee'), a right ankle ('RightAnkle'), a left hip ('LeftHip'), a left knee ('LeftKnee'), a left ankle ('LeftAnkle'), pelvis ('Pelvis'), and the like.

The prediction model may be pretrained to estimate location information about joints from an image through a deep learning network or an artificial neural network, for example, a convolutional neural network (CNN) and/or a deep neural network (DNN). The prediction model and a method of building the prediction model are further described with reference to FIGS. 8 to 10.

In operation 420, the estimated location information about each joint may include 3D coordinate information about each joint. That is, location information about each joint may represent coordinates (x, y, z) at which each corresponding joint is located within a 3D space.

In operation 430, the computer system 100 or the postprocessing circuitry 340 may perform postprocessing of the location information estimated in operation 420. For example, in operations 432 and 434, the computer system 100 may determine erroneously estimated location information in the estimated location information and may correct the erroneously estimated location information. That is, the computer system 100 may correct location information about a joint that is determined to be erroneously estimated or may not use the erroneously estimated location information to generate the following animation data. The operation performed by the postprocessing circuitry 340 in operation 430 may be integrated with an operation by the predictor 330.

Through operation 430, further accurate location information about a joint of the object 130 may be estimated.

In operation 440, the computer system 100 or the animation generator 350 may generate animation data that represents a movement of the object 130 based on the estimated or the postprocessed location information.

The generated animation data may include rotation information about each joint based on 3D location information about each joint that is based on the 3D coordinate information estimated or postprocessed for each joint and consecutive 3D coordinate information continuously estimated or postprocessed for each joint. The 3D location information about each joint may correspond to 3D coordinate information estimated for each corresponding joint. The rotation information about each joint may include a rotation angle of each corresponding joint. The computer system 100 may calculate a rotation angle of a corresponding joint by comparing 3D coordinate information consecutively estimated for each joint.

The animation data may be information that represents a movement of each joint. 3D location information about each joint included in the animation data may correspond to translation information in RST (rotation, scale, translation) information about each joint. Rotation information about each joint included in the animation data may correspond to rotation information in the RST information about each joint. The animation data may not include scale (i.e., zoom-in/zoom-out) information about each joint.

In operation 450, the computer system 100 or the animation generator 350 may postprocess the generated animation data. For example, in operations 452 and 454, the computer system 100 may determine whether rotation information representing an abnormal rotation state is present in the rotation information about each joint, and may appropriately correct the rotation information that is determined to represent the abnormal rotation state.

For example, in operation 452, the computer system 100 may verify whether a rotation angle of each joint is within the range of motion of a person, and, if the rotation angle is out of the range of motion of the person, may determine that rotation information corresponding to the rotation angle represents an abnormal rotation state. That is, the computer system 100 may determine whether the rotation information about each joint is within the range of an angle preset to correspond to a normal movement of the object 130, and if the rotation information is within the range of the angle, may determine that the corresponding rotation information represents a normal rotation state. On the contrary, if the rotation information about each joint is out of the range of the angle preset to correspond to the normal movement of the object 130, the computer system 100 may determine that the corresponding rotation information represents the abnormal rotation state.

A reference range for determining whether a rotation angle of each joint is within the range of motion of the person generally relates to determining whether the rotation angle is out of the range of motion of a corresponding joint of the person and may be preset. The reference range may be set or preset for each joint and may be set or preset for each of an x axis, a y axis, and a z axis. For example, minimum to maximum rotation angles of a joint associated with a movement of a head in an x-axial direction may be set to −37 degree to 22 degree (Angle=MIN(MAX(−37, Angle), 22)). If a rotation angle in an x-axial direction included in rotation information about a joint associated with the movement of the head is out of the range of −37 degree to 22 degree, the computer system 100 may determine the corresponding rotation information as rotation information that represents the abnormal rotation state. In general, the range of motion of a joint of the person may be set as shown in the following Table 1, for each joint, that is, for each part (bone) involved with each joint. A value of each joint provided as an example in the following Table 1 may represent a rotation limit value about each joint that applies to a file (e.g., a BHV file) including generated motion capture data (animation data according to an example embodiment) of the person. The following values for the respective joints may appropriately vary according to a person subject to pose estimation (e.g., if the person subject to the pose estimation is a gymnast).

TABLE 1

| Bone (joint) | x-axial range | x-axial stiffness | y-axial range | y-axial stiffness | z-axial range | z-axial stiffness |
|---|---|---|---|---|---|---|
| Head | −37~22 | 84% | −45~45 | 75% | −30~30 | 83% |
| Neck | −37~22 | 84% | −45~45 | 75% | −30~30 | 83% |
| Left collar (lCollar) | Locked | Not applicable | −30~10 | 89% | −30~30 | 83% |
| Right collar (rCollar) | Locked | Not applicable | −10~30 | 89% | −30~30 | 83% |
| Left shoulder (lShldr) | −135~90 | 38% | −180 (−105) ~98 | 44% | −91~97 | 48% |
| Right shoulder (rShldr) | −135~90 | 38% | −98-180 105) | 44% | −97~91 | 48% |
| Left forearm (lForeArm) | −90~79 | 53% | −146~0 | 59% | Locked | Not applicable |
| Right forearm (rForeArm) | −90~79 | 53% | 0~146 | 59% | Locked | Not applicable |
| Left hand (lHand) | −45~45 | 99% | −25~36 | 83% | −90~86 | 51% |
| Right hand (rHand) | −45~45 | 99% | −36~25 | 83% | −86~90 | 51% |
| Chest | −45~22 | 81% | −45~45 | 75% | −30~30 | 83% |
| Abdomen | −45~68 | 69% | −45~45 | 75% | −30~30 | 83% |
| Hip | Not applicable | Not applicable | Not applicable | Not applicable | Not applicable | Not applicable |
| Leftthigh (lThigh) | −155~45 | 44% | −85~105 | 47% | −17~88 | 71% |
| Right thigh (rThigh) | −155~45 | 44% | −105~85 | 47% | −88~17 | 71% |
| Left shin (lShin) | 0~150 | 58% | Locked | Not applicable | Locked | Not applicable |
| Right shin (rShin) | 0~150 | 58% | Locked | Not applicable | Locked | Not applicable |
| Left foot (lFoot) | −31~63 | 74% | −26~26 | 86% | −74~15 | 75% |
| Right foot (rFoot) | −31~63 | 74% | −26~26 | 86% | −15~74 | 75% |

The stiffness of each joint (bone) may be a value that represents how easily a corresponding joint rotates based on a specific axis. If a stiffness value is appropriately set, bones and joints may realistically move in response to applying inverse kinematics. If the stiffness value increases, rotation on a corresponding axis may be minimized. Since a joint (e.g., pelvis) corresponding to a hip is a root of bone hierarchy of the person, the corresponding joint may rotate the entire body. Therefore, the joint corresponding to the hip may be set to have no limitation or have no stiffness value in terms of rotation. In operation 454, the computer system 100 may correct a rotation angle of rotation information that represents the abnormal rotation state as a rotation angle that represents the normal rotation state, or may not use the rotation angle of rotation information that represents the corresponding abnormal rotation state to generate the virtual character 150. The computer system 100 may appropriately correct the rotation angle of rotation information that represents the abnormal rotation state using interpolation.

The operation performed by the animation generator 350 in operation 450 may be integrated with the operation by the postprocessing circuitry 340. That is, correction of the rotation angle of each joint may be performed by the postprocessing circuitry 340.

Through operation 450, the virtual character 150 that more accurately mimics a movement of the object 130 may be generated without including a joint that represents an abnormal rotation.

In operation 460, the computer system 100 or the outputter 360 may generate the virtual character 150 that mimics the movement, that is, the 3D pose of the object 130 by mapping the plurality of joints of the object 130 to the virtual character 150 based on the generated animation data. That is, the computer system 100 may render the virtual character 150 that mimics the movement of the object 130. Rendering may be performed by a shader. The generated virtual character 150 may be output through the display 220. The computer system 100 may generate the 3D virtual character 150 that mimics the movement of the object 130 captured through the camera 120 in real time and may display the virtual character 150 in real time. The virtual character 150 may be included in an output image and displayed on a user terminal, that is, the computer system 100.

The computer system 100 may determine whether the object 130 is facing the front or standing back by estimating the movement of joints of the object 130. Accordingly, a direction of the virtual character 150 generated may be determined.

3D location information about each joint that includes z-axial coordinates is included in animation data. Therefore, although the animation data does not include scale information about each joint, the 3D virtual character 150 that accurately mimics the movement of the object 130 may be generated.

Figure 11A:
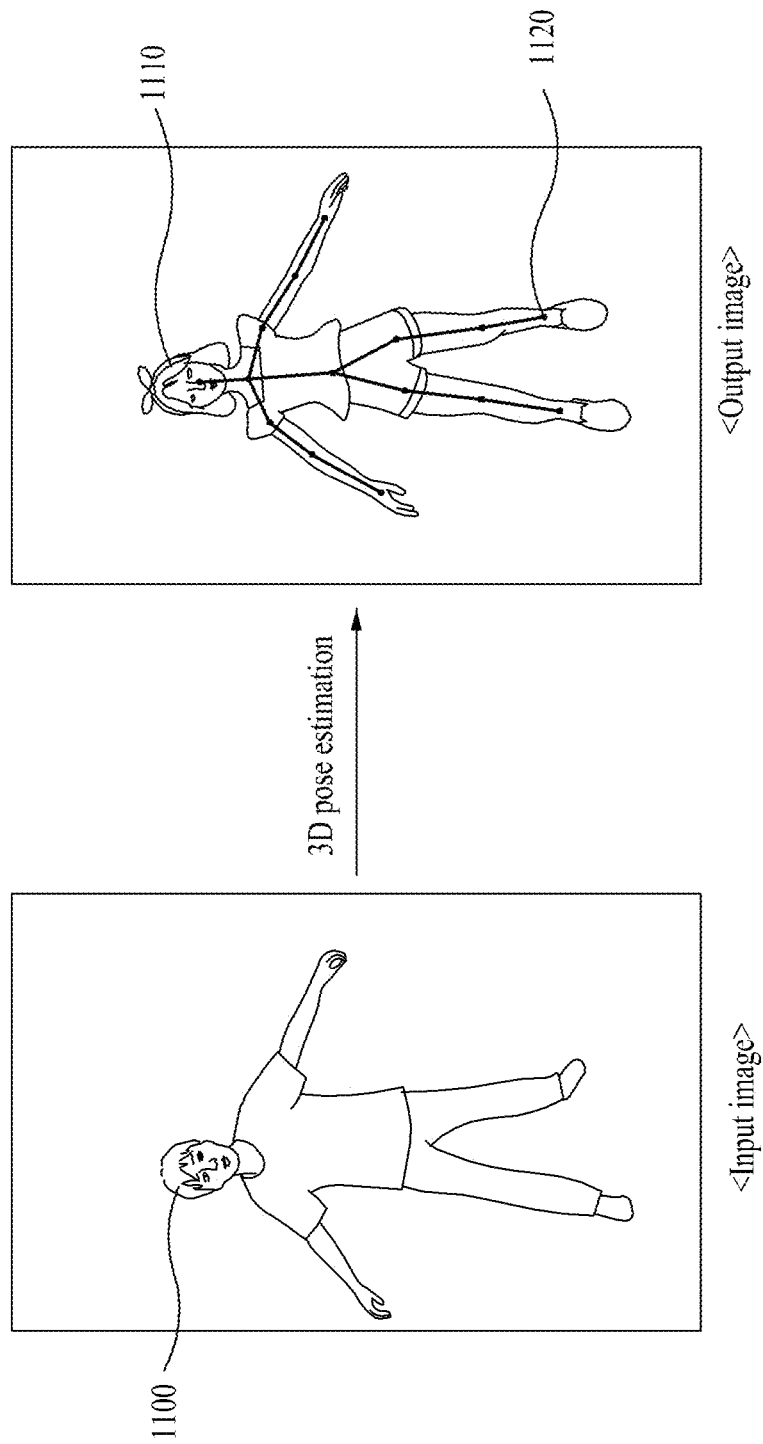
FIGS. 11A and 11B illustrate examples of estimating a 3D pose of an object included in a 2D input image according to at least one example embodiment.

In relation thereto, FIG. 11A illustrates an example of estimating a 3D pose of an object 1100 included in a 2D input image according to at least one example embodiment.

Referring to FIG. 11A, as the 3D pose of the object 1100 included in the 2D input image is estimated, a 3D virtual character 1110 may be generated. Location information estimated for 15 joints of the object 1100 or animation data 1120 according thereto may be mapped to a character. The generated virtual character 1110 may mimic a movement of the object 1100 in real time. The animation data 1120 may represent a result of estimating location information about joints of the object 1100 using the aforementioned prediction model.

Description related to technical features made above with reference to FIGS. 1 to 3 may apply alike to FIGS. 4 and 11A and thus, further description is omitted.

Figure 5:
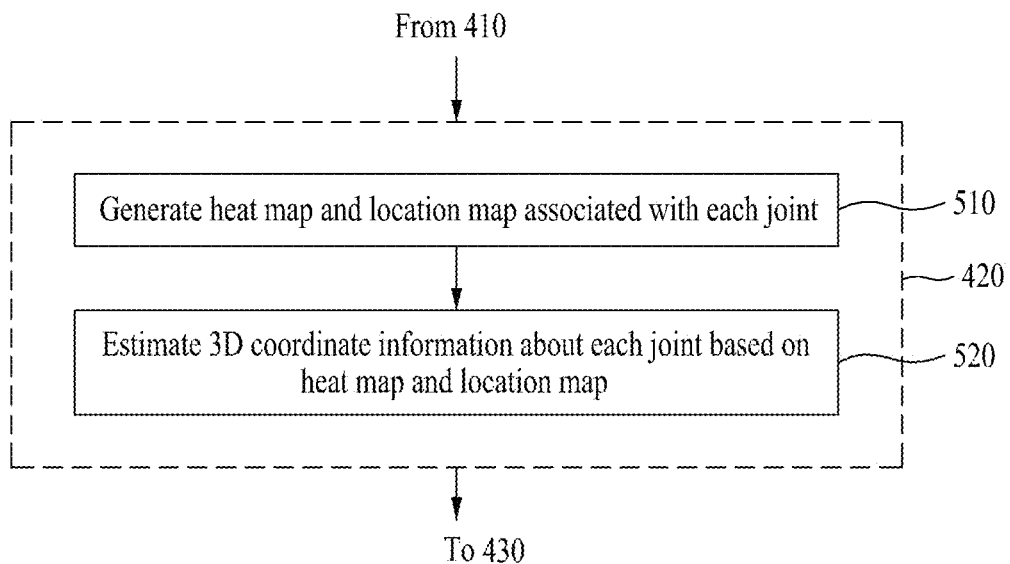
FIG. 5 is a flowchart illustrating an example of a method of estimating location information about a joint of an object included in a 2D input image according to at least one example embodiment.

FIG. 5 is a flowchart illustrating an example of a method of estimating location information about a joint of an object included in a 2D input image according to at least one example embodiment.

Hereinafter, a method of estimating location information about each joint of the object 130 using the computer system 100 or the predictor 330 is further described with reference to FIG. 5.

Referring to FIG. 5, in operation 510, the computer system 100 may generate a heat map and a location map for each of a plurality of joints of the object 130. Each of the heat map and the location map may be a 2D image. The location map may include information that represents a location in an x-axial direction, information that represents a location in a y-axial direction, and information that represents a location in a z-axial direction for each joint. The heat map may represent a likelihood of each joint for each pixel location. That is, the heat map may represent a likelihood that each joint may be present at each pixel location in the heat map.

In operation 520, the computer system 100 may estimate 3D coordinate information about each joint as location information about each joint based on the heat map and the location map for each joint.

By performing postprocessing of the location information estimated in operation 430 of FIG. 4, the computer system 100 or the postprocessing circuitry 340 may determine whether a value on the heat map for each joint corresponding to the 3D coordinate information about each joint is less than a desired threshold in operation 432. Here, if the value on the heat map corresponding to the 3D coordinate information is less than the desired threshold, the computer system 100 may determine that the 3D coordinate information is erroneously estimated. In operation 434, the computer system 100 may correct the 3D coordinate information that is determined to be erroneously estimated.

For example, the computer system 100 may determine whether 3D coordinate information estimated for each joint is erroneously estimated based on a maximum value of a heat map for a corresponding joint. If the maximum value of the heat map is less than a desired threshold, for example, 0.5, the computer system 100 may determine the estimated 3D coordinate information as an unstable and erroneously estimated value.

The computer system 100 may correct the corresponding 3D coordinate information by applying a filter, for example, a 1-euro filter and/or intermediate filter, to 3D coordinate information corresponding to the estimated location information.

Accordingly, more accurate 3D coordinate information about joints of the object 130 may be estimated.

Description related to technical features made above with reference to FIGS. 1 to 4 and 11A may apply alike to FIG. 5 and thus, further description is omitted.

Hereinafter, the aforementioned postprocessing performed by the postprocessing circuitry 340 for location information estimated for each joint is further described.

The aforementioned prediction model may perform 3D pose estimation for the object 130 based on a convolutional neural network (CNN), which may cause unallowable small jitter, that is, unallowable artifact in terms of a graphics application. A value of location information corresponding to the jitter and the unallowable artifact may be corrected through postprocessing.

To reduce time-series jitter and artifact, the postprocessing circuitry 340 may apply a specific filter, for example, a 1-euro filter, to a 2D keypoint of the estimated location information and may use a keypoint (K) to which such a filter is applied to refer to a value of a corresponding location map. A filter may apply to location information that represents an estimated 3D pose to reduce time-series noise according to a consecutive image estimation result.

Meanwhile, the location information that represents the estimated 3D pose corresponds to root-relative 3D position information of each joint and thus, may not directly apply to a character animation. Accordingly, inverse kinematics may apply to convert 3D location information of each joint to an orientation. Also, the 1-euro filter may apply to such orientation values.

Figure 6:
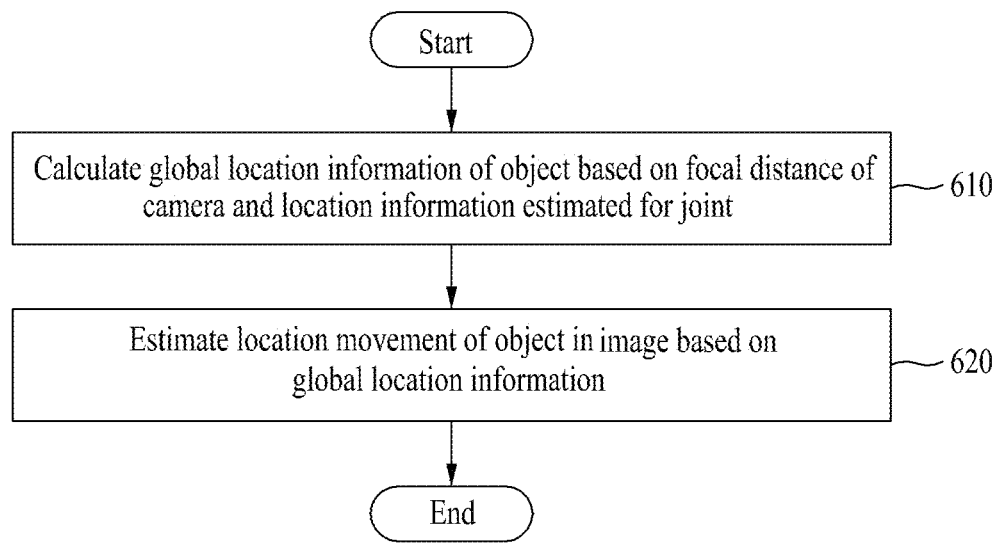
FIG. 6 is a flowchart illustrating an example of a method of calculating global location information of an object included in a 2D input image according to at least one example embodiment.

FIG. 6 is a flowchart illustrating an example of a method of calculating global location information of an object included in a 2D input image according to at least one example embodiment.

Hereinafter, a method of estimating a movement of the object 130 if the object 130 moves in an input image and applying the estimated movement of the object 130 to generate the virtual character 150 corresponding thereto is described with reference to FIG. 6.

Referring to FIG. 6, in operation 610, the computer system 100 or the outputter 360 may calculate global location information that represents a global location of the object 130 based on a focal distance of a camera, for example, the camera 120, used to capture the input image and location information estimated for at least one of a plurality of joints of the object 130, that is, 3D location information about a joint. The global location of the object 130 may represent an absolute location of the object 130 in the input image. That is, the global location may represent a movement of the object 130 itself in the input image, which is distinguished from a movement of the object 130 corresponding to a movement of each joint of the object 130. For example, if the input image is an image in which the object 130 dances, a movement of the object 130 dancing in place may be estimated based on location information about each joint estimated in operation 420. However, if the object 130 dances while moving on a stage, a movement of the object 130 on the stage may be estimated by calculating a global location of the object 130.

In operation 620, the computer system 100 may estimate a location movement of the object 130 in the input image based on the calculated global location information.

Through operations 610 and 620, the virtual character 150 that more accurately applies a 3D pose and a movement of the object 130 may be generated.

The aforementioned operations 610 and 620 may be performed by not the outputter 360 but the postprocessing circuitry 340.

In relation thereto, FIG. 11 illustrates an example of estimating a 3D pose of the object 1100 included in a 2D input image according to at least one example embodiment.

Figure 11B:
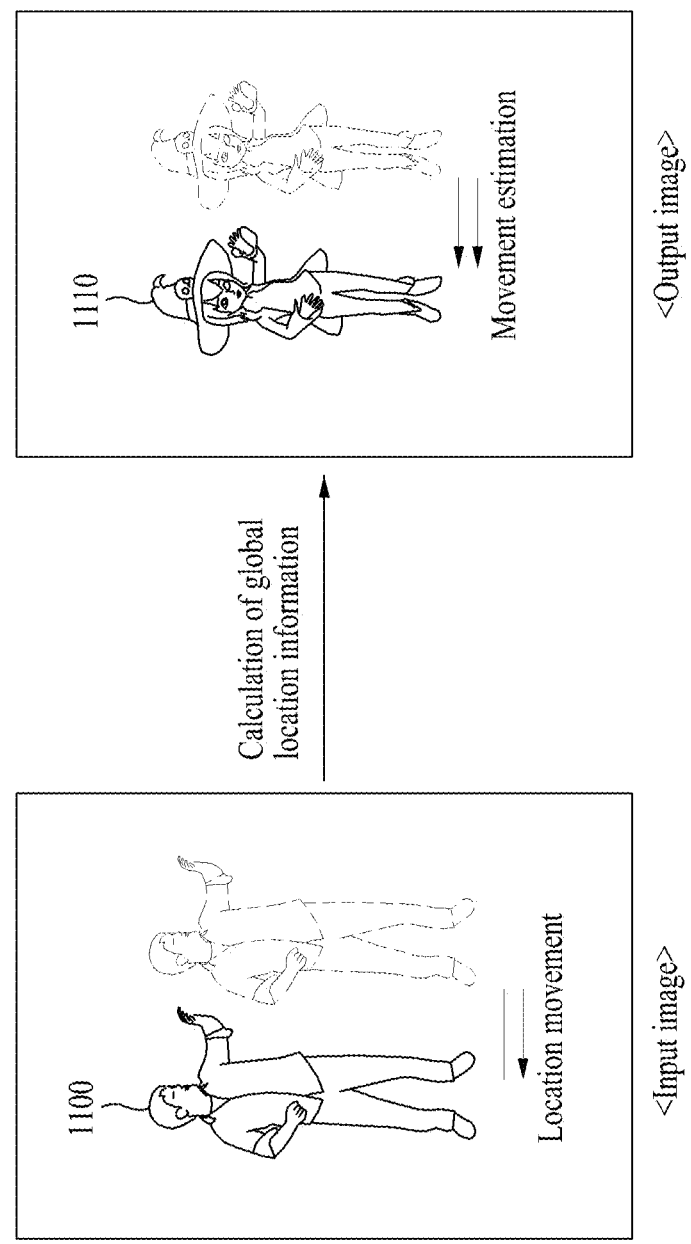

Referring to FIG. 11B, if the object 1100 not only simply moves in place but also globally moves in an input image, the computer system 100 may calculate global location information that represents a global location of the object 1100 and accordingly, may estimate a global location movement of the object 1100 in the input image. The generated virtual character 1110 may also mimic even the global location movement of the object 1100.

Hereinafter, a method of calculating, by the computer system 100, global location information that represents a global location of the object 130 based on a focal distance of a camera, for example, the camera 120, used to capture the input image and estimated location information about joints of the object 130, that is, 3D coordinate information about joints is further described.

Depending on example embodiments, since a 3D pose of the object 130 is estimated from a cropped input image by applying a bounding box to the input image, a root-relative 3D pose acquired through estimation may relate to losing global location information of the object 130.

The global location information of the object 130 may be recovered according to the following Equation 1. In Equation 1, $P^{3D}_G$ denotes global location information of the object 130.

[Equation 1]

$$P^{3D}_G = \frac{\sqrt{\sum_1^J \|P^i_{[xy]} - \overline{P}_{[xy]}\|_2}}{\sqrt{\sum_1^J \|K^i - \overline{K}\|_2}} \begin{pmatrix} \overline{K}_{[x]} \\ \overline{K}_{[y]} \\ f \end{pmatrix} - \begin{pmatrix} \overline{P}_{[x]} \\ \overline{P}_{[y]} \\ 0 \end{pmatrix}$$

In Equation 1, $\overline{P}$ and $\overline{K}$ denote the 3D mean and the 2D mean for all of the joints of the object 130, respectively. In particular, $\overline{K}$ may have a value of a screen coordinate system. $P_{[x,y]}$ denotes an x, y part of $P^{3D}$ and a unit lower symbol denotes a specific element. Also, f denotes the focal distance of the camera, for example, the camera 120, used for capturing of the object 130. That is, the global location information of the object 130 may be calculated based on the focal distance of the camera used for capturing of the object 130 and 2D location information and 3D location information about each joint before and after estimation by a prediction model.

Based on the calculated global location information, the virtual character 150 that mimics not only a 3D pose but also a global movement of the object 130 may be generated.

Description related to technical features made above with reference to FIGS. 1 to 5 and FIGS. 11A and 11B may also apply alike to FIG. 6 and thus, further description is omitted.

Figure 7:
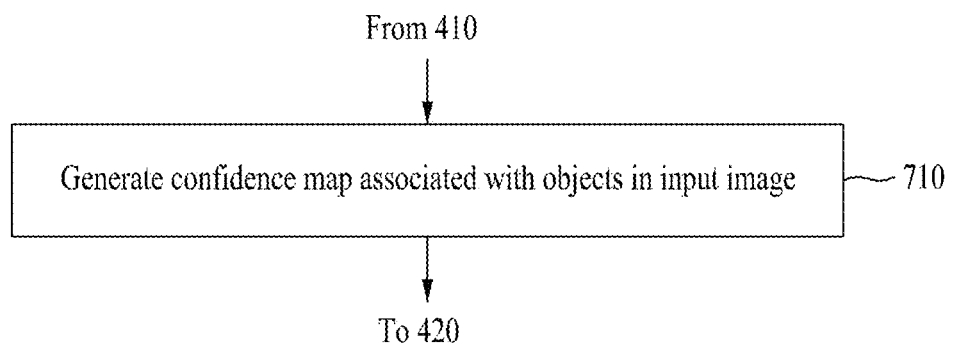
FIG. 7 is a flowchart illustrating an example of a method of generating data for estimating 3D poses of a plurality of objects included in a 2D input image according to at least one example embodiment.

FIG. 7 is a flowchart illustrating an example of a method of generating data for estimating 3D poses of a plurality of objects included in a 2D input image according to at least one example embodiment.

Hereinafter, a method of generating data for estimating 3D poses of objects if an acquired input image includes a plurality of objects is described with reference to FIG. 7.

Referring to FIG. 7, in operation 710, the computer system 100, or the inputter 310 or the preprocessing circuitry 320 may generate a confidence map associated with a corresponding plurality of objects with respect to the input image that includes the plurality of objects.

The confidence map may include vector information associated with each of the plurality of joints of each of the plurality of objects included in the input image. The vector information may be information used to identify which joint is included in which object.

When the computer system 100 estimates location information about each joint in operation 420, the computer system 100 may estimate location information about each of a plurality of joints of each object to be distinguished from that of another object among the plurality of objects using the confidence map generated in operation 710. That is, based on vector information included in the confidence map, a joint of which location information is to be estimated may be identified, for example, specified. Therefore, in operations 420 to 460, the computer system 100 may distinguishably estimate a 3D pose corresponding to a movement of each of the plurality of objects. Depending on example embodiments, 3D poses of the respective objects may be simultaneously estimated with respect to the input image that includes the plurality of objects.

In some example embodiments, if the input image includes the plurality of objects, the computer system 100 may acquire, from the corresponding input image, only a partial image that includes a single object among the plurality of objects. The partial image that includes a single object may be a cropped image such that the input image may include the single object, or may be an image in which a portion that represents the single object is deleted or blurred (or processed in other manners) in the input image.

The computer system 100 may perform operation 420 of estimation and operation 440 of generation, including operation 430 of postprocessing, in parallel with respect to each partial image each including a single object among the plurality of objects included in the input image, or may sequentially perform the above operations 420 to 440 for each partial image that includes each single object.

If operations 420 to 440 are processed in parallel, 3D poses of the plurality of objects included in the input image may be simultaneously estimated. In some example embodiments, if operations 420 to 440 are sequentially processed for each partial image, 3D poses of the plurality of objects included in the input image may be sequentially estimated.

Meanwhile, in operation 460, the computer system 100 may generate a plurality of virtual characters that mimics the movement of the object 130 by mapping the plurality of joints of the object 130 to each of the plurality of virtual characters based on the generated animation data. That is, the computer system 100 may generate the plurality of virtual characters that mimics the movement of the corresponding object 130 with respect to the input image that includes a single object 130. The plurality of virtual characters may differ from each other.

In some example embodiments, as described above, if the input image includes the plurality of objects, the computer system 100 may generate the plurality of virtual characters that mimics the movement of the plurality of objects by mapping a plurality of joints of each of the plurality of objects to a corresponding virtual character.

Each of the generated plurality of virtual characters may be arranged at a different location of an output image that is output from a user terminal, that is, the computer system 100. For example, each of the generated plurality of virtual characters may be arranged at a location that is determined according to a manipulation on the user terminal by a user of the user terminal, that is, the computer system 100, within the output image from which a corresponding virtual character is output. That is, the user may select a location at which a virtual character corresponding to each object is to be arranged in the output image and accordingly, the user may customize the output image. Therefore, the arrangement of objects in the input image may differ from the arrangement of virtual characters in the output image according to the manipulation of the user.

Figure 12:
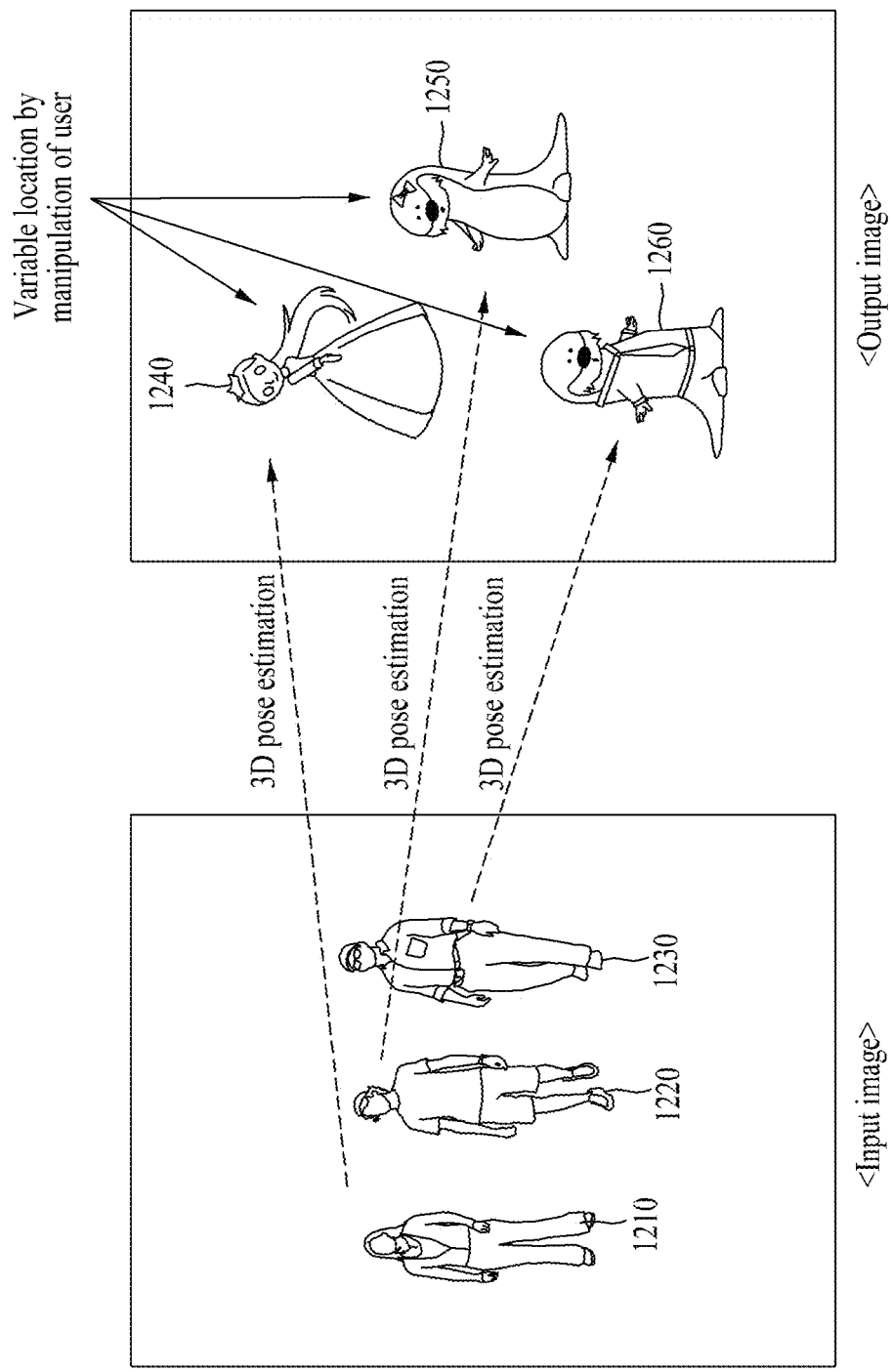
FIG. 12 illustrates an example of estimating 3D poses of a plurality of objects included in a 2D input image according to at least one example embodiment.

In relation thereto, FIG. 12 illustrates an example of estimating 3D poses of a plurality of objects included in a 2D input image according to at least one example embodiment.

Referring to FIG. 12, different objects 1210, 1220, and 1230 included in an input image may be converted to different (virtual) characters 1240, 1250, and 1260, respectively, according to 3D pose estimation. Locations of the characters 1240, 1250, and 1260 in an output image may differ from locations of the objects 1210, 1220, and 1230 in the input image. For example, the user may change a location of each of the characters 1240, 1250, and 1260 by manipulating the user terminal, that is, the computer system 100, on which the output image is displayed.

Meanwhile, although not illustrated, at least two of the characters 1240, 1250, and 1260 may be generated by estimating a 3D pose of one of the objects 1210, 1220, and 1230.

In some example embodiments, to generate the output image that includes the plurality of characters 1240, 1250, and 1260, a plurality of input image may be used. That is, although not illustrated, the plurality of objects 1210, 1220, and 1230 may be included in different input images, respectively, or the plurality of characters 1240, 1250, and 1260 may be estimated from the plurality of input images. The computer system 100 may generate a single output image that includes the plurality of characters 1240, 1250, and 1260 by performing 3D pose estimation for the plurality of input images that includes the objects 1210, 1220, and 1230.

Description related to technical features made above with reference to FIGS. 1 to 6 and FIGS. 11A and 11B may apply alike to FIGS. 7 and 12 and thus, further description is omitted.

Hereinafter, a prediction model and a method of building the prediction model according to at least one example embodiment are further described with reference to FIGS. 8 to 10.

In the following description related to the prediction model and building the prediction model, the terms "learning" and "training" may be used together and may also be interchangeably used throughout.

Figure 8:
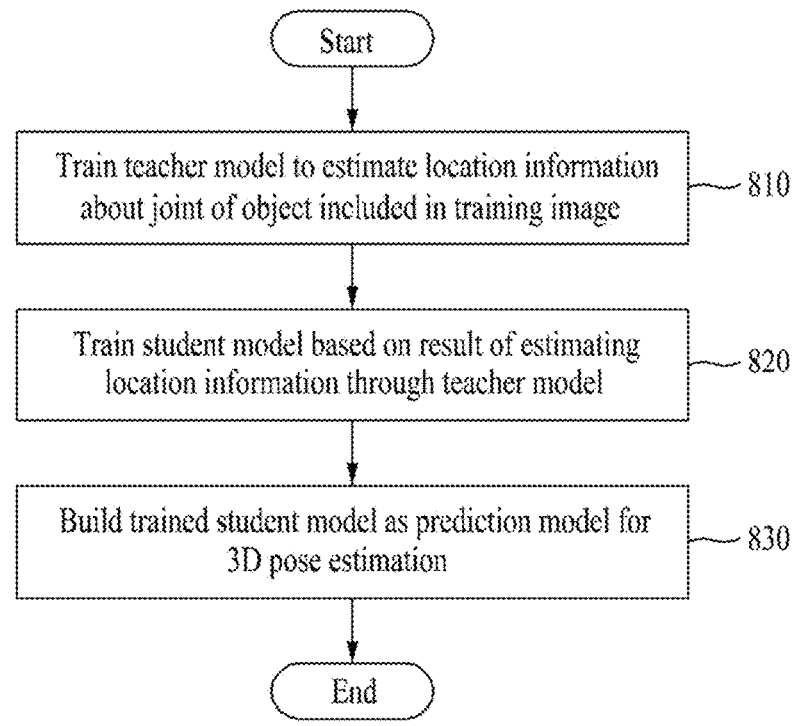
FIG. 8 is a flowchart illustrating an example of a method of building a prediction model for estimating a 3D pose of an object included in a 2D input image according to at least one example embodiment.

FIG. 8 is a flowchart illustrating an example of a method of building a prediction model for estimating a 3D pose of an object included in a 2D input image according to at least one example embodiment.

The prediction model provided to the computer system 100 may be pretrained to estimate location information about each of a plurality of joints of the object 130. The prediction model may be a compressed model to be mountable to a mobile terminal, and may be a model named, for example, MoVNect model.

The prediction model may correspond to a student model in a teacher-student learning model. The student model may be a further compressed model compared to the pretrained teacher model of the prediction model. That is, the student model may include a compressed neural network compared to the teacher model through model compression. The student model may include a number of layers less than that of the teacher model. In some example embodiments, the student model may include a number of hidden layers than that of the teacher model or may include a number of filters or a number of nodes less than that of the teacher model. The student model may refer to a model that is trained to learn location information about a plurality of joints of an object included in a predetermined (or, alternatively, desired) training image, for example, a 2D input image for training (hereinafter, also referred to as a training 2D input image), and to estimate such location information. The student model may use a result of estimating location information about the plurality of joints of the object included in the training 2D input image through the teacher model in learning location information about the plurality of joints of the object included in the training 2D input image. For example, when the prediction model learns location information about the plurality of joints of the object included in the input image, a result of estimating, by the teacher model, location information about the plurality of joints of the object included in the corresponding input image may be used to calculate a loss function. Therefore, the built prediction model may maintain the accuracy of estimation comparable to the teacher model while maintaining characteristics of the compressed student model.

Hereinafter, a method of building the prediction model is further described. The following operations 810 to 830 may be performed by a computer system for building the prediction model. The corresponding computer system, as an apparatus for providing the prediction model to the aforementioned computer system 100, may be a server or other computing devices. The following description is made by terming the computer system for building the prediction model as a model building device.

Referring to FIG. 8, in operation 810, the model building device may train a teacher model to estimate location information about a plurality of joints of an object included in a predetermined (or, alternatively desired) training image, for example, a training 2D input image. That is, the model building device may train the teacher model using the training 2D input image. The teacher model may be pretrained to estimate, from the training image, the location information about the plurality of joints of the object included in the corresponding training image. The prediction model according to an example embodiment may be trained using the pretrained teacher model.

The training 2D input image may be a set of plurality of 2D input images for training. The teacher model may be pretrained using 2D input images aware of ground truth, that is, ground truth input images.

In operation 820, the model building device may train the student model that is a more compressed model than the teacher model to learn location information about the plurality of joints of the object included in the corresponding training 2D input image based on a result of estimating location information about the plurality of joints of the object included in the training 2D input image through the teacher model. That is, the model building device may train the student model using the training 2D input image and the student model may be trained using the result of estimation by the teacher model.

That is, training may be performed by knowledge-distillation based on teacher-student learning. With respect to a training 2D input image to be learned, the teacher model may initially learn the training 2D input image and the compressed student model compared to the teacher model may learn the training 2D input image using the result of estimation by the teacher model. Therefore, the teacher model may condense knowledge about the training 2D input image and may transfer the condensed knowledge to the student model. Compared to a case of learning the training 2D input image without the teacher model, the student model may easily find an optimal solution. Therefore, the accuracy may be improved.

In operation 830, the model building device may build the student model trained in operation 820 as the prediction model for estimating a 3D pose of an object included in the 2D input image. The model building device may mount the trained student model to the computer system 100 as the aforementioned prediction model.

The student model may be trained using a loss function used to estimate location information of each object included in the 2D input image. The student model may be trained using a result estimated, that is, predicted by the teacher model and a loss function that is determined based on ground truth. The loss function used to train the student model may include a first loss function that is a loss function for a heat map and a second loss function that is a loss function for a location map. For example, in training the student model to learn location information about the plurality of joints of the object included in the training 2D input image, the student model may be trained using the first loss function that is calculated based on a difference between a first heat map for each of the plurality of joints estimated by the student model and a second heat map corresponding to ground truth for each joint and a difference between the first heat map and a third heat map for each joint estimated by the teacher model, and the second loss function that is calculated based on a difference between a first location map for each joint estimated by the student model and a second location map corresponding to ground truth for each joint and a difference between the first location map and a third location map for each joint estimated by the teacher model.

Here, the difference between the first heat map and the second heat map and the difference between the first heat map and the third heat map may be included in the first loss function with a predetermined (or, alternatively, desired) mixture ratio. Also, the difference between the first location map and the second location map and the difference between the first location map and the third location map may be included in the second loss function with a predetermined (or, alternatively) desired mixture ratio. Here, the mixture ratio may be, for example, 0.5. The mixture ratio associated with the first loss function and the mixture ratio associated with the second loss function may be set to differ from each other.

The result of estimation, that is, the result of learning result by the teacher model based on the mixture ratio may be used to train the student model. Therefore, the prediction model built by the student model according to an example embodiment may become a compressed model and, at the same time, achieve high estimation accuracy.

Description related to technical features made above with reference to FIGS. 1 to 7, and FIGS. 11 and 12 may apply alike to FIG. 8 and thus, further description is omitted.

Figure 9:
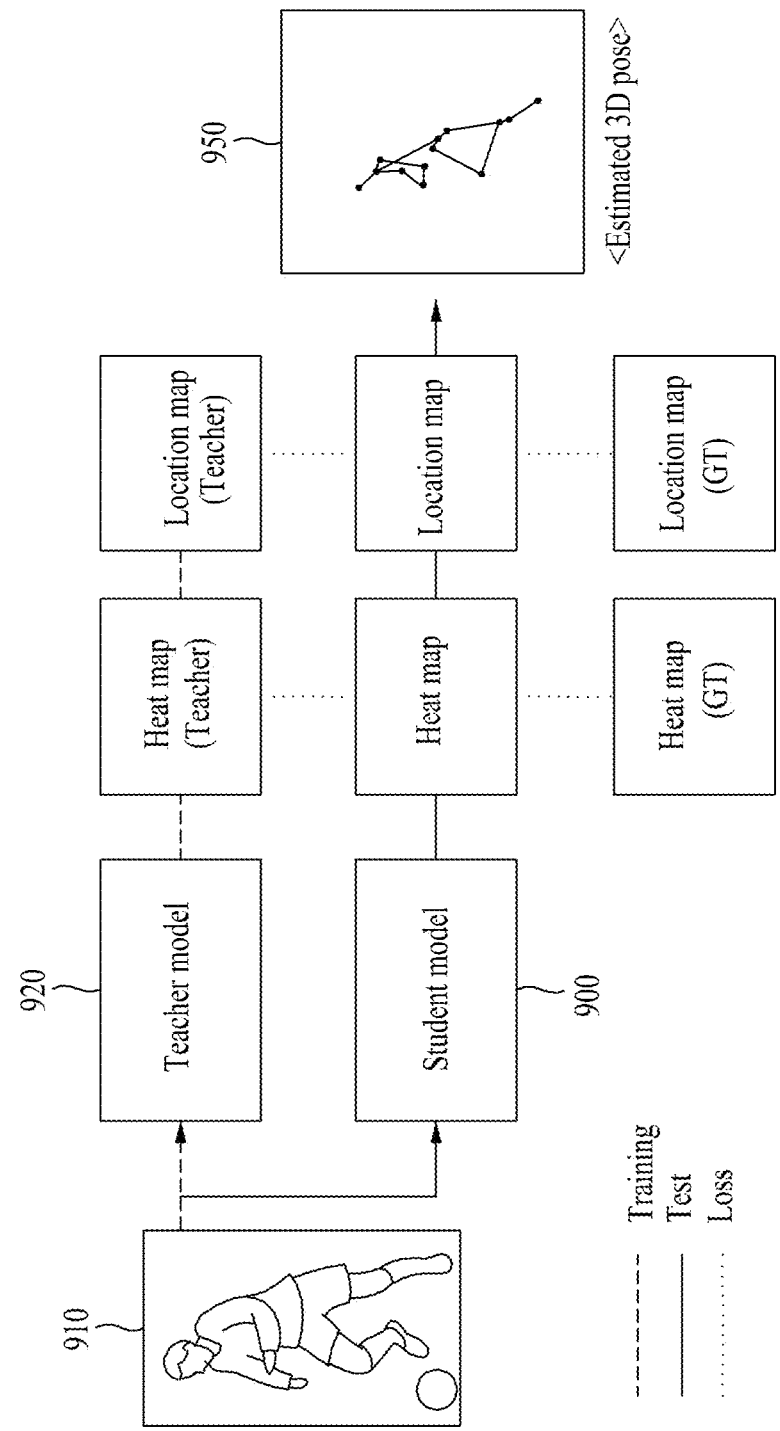
FIG. 9 illustrates an example of a method of building a prediction model for estimating a 3D pose of an object included in a 2D input image using a teacher-student model according to at least one example embodiment.
Figure 10:
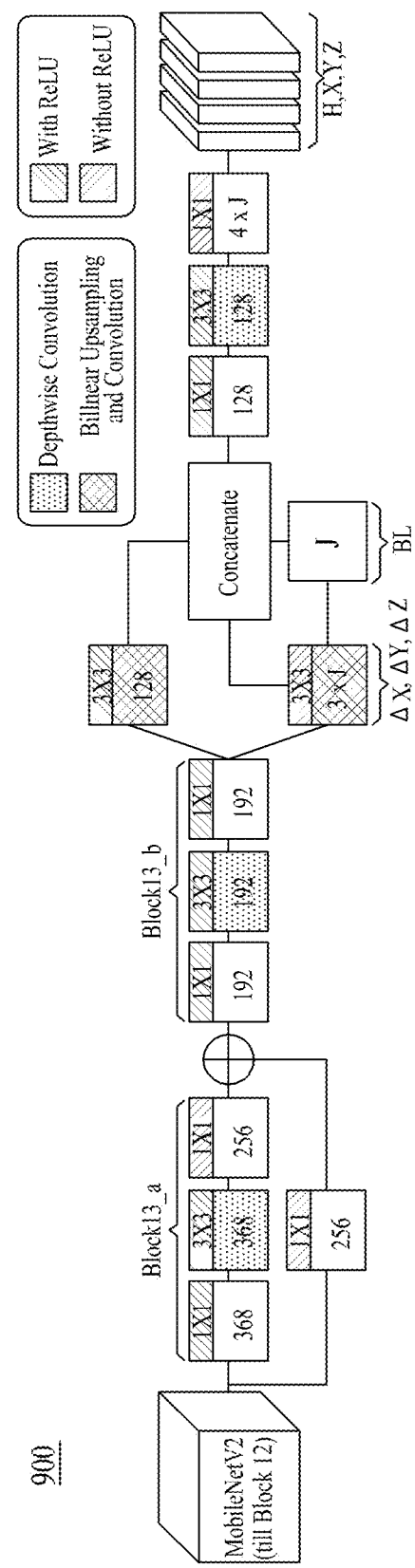
FIG. 10 illustrates an example of a prediction model for estimating a 3D pose of an object included in a 2D input image according to at least one example embodiment.

FIG. 9 illustrates an example of a method of building a prediction model for estimating a 3D pose of an object included in a 2D input image using a teacher-student model according to at least one example embodiment, and FIG. 10 illustrates an example of a prediction model for estimating a 3D pose of an object included in a 2D input image according to at least one example embodiment.

Hereinafter, a method of training a compressed prediction model for 3D pose estimation using teacher-student learning and building a training model is further described.

The prediction model built according to an example embodiment may be a compressed DNN-based model capable of performing 3D pose estimation from an input image captured through a single RGB camera. The prediction model may also be referred to as MoVNect model. As described above, to enforce the estimation performance of the prediction model, a knowledge distillation method based on teacher-student learning may be used to train the prediction model for estimating a 3D pose.

Location information about a joint of an object included in an image, estimated by the prediction model, may be generated as 3D skeleton information of which CNN output is stabilized in terms of time series through postprocessing, which may be directly applied in an application, for example, an application for generating a 3D character or an avatar.

The prediction model may estimate a 3D pose of an object in real time in an image captured in real time. The estimated 3D pose of the object may be used to analyze the athletic performance and to capture a body and gesture motion in an augmented reality (AR) environment or a virtual reality (VR) environment. The prediction model according to an example embodiment may estimate location information about a joint of an object, for example, a person, without depending on a wearable suite mounted with a sensor and a plurality of cameras or without requiring a depth camera to acquire the location information. Accordingly, since expensive special equipment, a correction procedure, or a specific light source is not required, a 3D pose of an object may be estimated without limitation in indoor and outdoor environments.

To build a model that estimates a pose in an RGB image using a DNN and to improve the performance of a deep learning-based model, there is a need to prepare a very deep and wide layer, which may lead to high arrangement cost. Further, it may increase a floating-point operations per second (FLOPS), which may make it inappropriate to mount the built model to a device with a limited computing resource, such as a smartphone, an embedded system, and the like. To reduce the FLOPS, the prediction model may be designed using a relatively small number of parameters and may also be designed with an efficient work, such as deep convolution.

The prediction model according to an example embodiment may be trained to decrease a parameter according to compression and also minimize a degradation in the estimation accuracy. As described above, the prediction model may be built based on a teacher-student model learning method and the prediction model built accordingly may achieve relatively higher estimation accuracy compared to a model trained without teacher learning.

A method of building a student model trained using a training 2D input image 910 as a prediction model based on a teacher-student model learning method according to an example embodiment is described with reference to FIG. 9. Initially, a teacher model 920 may be trained using the training 2D input image 910. The teacher model 920 may include a plurality of neural network layers. Subsequently, a student model 900 further compressed compared to the teacher model 920 may be trained using the training 2D input image 910. The student model 900 may be trained through a mimicry loss function for transferring 3D pose knowledge of the teacher model 920 using extra supervision of the teacher model 920. The trained compressed student model 900 may not depend on the teacher model 920 and may exhibit further excellent estimation accuracy compared to a student model that is not trained through the teacher model 920. An estimated 3D pose 950 may represent a result of pose estimation by a built prediction model, that is, the student model 900. Ground truth (GT) used for training of the student model 900 and the teacher model 920 may be a known value. The GT, as ground truth for the training 2D input image 910 or a set of other training input images, may refer to ground truth data about the training 2D input image 910 or a set of other training input images acquired by capturing an object using, for example, a plurality of sensors, a plurality of cameras, a wearable suit attached therewith, or a depth camera. The ground truth data may include a GT heat map and a GT location map. The loss function for training the student model 900 may be determined based on the GT heat map and the GT location map, a heat map and a location map estimated by the teacher model 920, and a heat map and a location map estimated by the student model 900. A method of determining the loss function is further described below.

The aforementioned knowledge distillation may relate to transferring information between different networks having distinguishable capacity. The main idea of the knowledge distillation is to apply an additional map using a teacher model in a class probability, a feature representation, or an inter-layer flow. It may be used for efficient training of a small network that may not be readily trained using a large network that may be relatively easily trained. That is, knowledge of the large network may be successfully transferred to the small network through knowledge distillation. Also, compared to an offline-based method, further effective optimization may be achieved through online-based distillation. According to an example embodiment, the knowledge distillation may be expanded to 3D pose estimation in terms of a classification. That is, an efficient and compressed pose estimation model may be trained by transferring knowledge of a heat map and a location map corresponding to a joint of an object. According to an example embodiment, the compressed prediction model may be built and accordingly, a 3D pose of an object included in an input image may be estimated even in equipment having relatively low processing capability.

The prediction model 900 built according to an example embodiment may be compressed with a number of parameters as 1/14 and with a file size of a model less than 1/3 to 1/10, compared to the teacher model 920 or a comparison model configured to maintain the same level of estimation accuracy. Also, if the prediction model 900 operates in the computer system 100, the prediction model 900 may exhibit an improved 3D pose estimation speed of about six times in a central processing unit (CPU), about three times in a graphics processing unit (GPU), and about 2.8 times in a neural network processing unit (NPU) compared to the comparison model.

FIG. 10 illustrates an example of a prediction model for estimating a 3D pose of an object included in a 2D input image according to at least one example embodiment. The prediction model 900 of FIG. 10 may correspond to the student model 900 of FIG. 9 and thus, may also be referred to as the prediction model 900 herein.

The prediction model 900 may include a backbone network. The backbone network may be a base network configured to receive an RGB image as an input image. The backbone network may be a model pretrained to estimate location information about a joint of an object in an image. For example, the backbone network may be MobileNet (or MobileNetV2) model and only blocks till block 12 may be used as the backbone network for the prediction model 900. As shown in the prediction model 900 including Block 13_a, Block 13_b and concatenate element, the prediction model 900 may be implemented using a pointwise and depthwise CNN-based structure for efficient feature extraction. Also, the prediction model 900 may include a structure for compression, such as decomposition and skip connection. Here, J denotes a joint and BL denotes a bone length. Intermediate features $^{\Delta}X$, $^{\Delta}Y$, and $^{\Delta}Z$ may be used for a feature corresponding to BL. The feature corresponding to BL may be an auxiliary clue used to estimate a root-relative 3D human pose. According to an example embodiment, pelvis is used as a root and, in this case, the feature corresponding to BL may be a 3D pose on a relative coordinate system based on the pelvis. The prediction model 900 may generate or estimate a heat map (H) for each joint and location maps (X, Y, Z) for the respective coordinate axes.

Hereinafter, the prediction model 900 for estimating a 3D pose is further described.

In estimating a 3D pose of an object, a 3D pose $P^{3D}$ is estimated from a given RGB image I that is an input image. $P^{3D} \in R^{3 \times J}$ may represent a root-relative 3D position of the joint J of the object. The prediction model 900 according to an example embodiment may be mounted to a low power device, for example, a smartphone and an embedded system, and executed. The prediction model 900 may estimate 15 joints (J=15) for a motion of a 3D whole body of the object.

According to an example embodiment, the prediction model 900 may be trained by applying knowledge distillation to a heat map and a location map for each joint of the object. The heat map and the location map may represent 2D space information and thus, the knowledge distillation may be easily applied to the heat map and the location map. The prediction model 900 may generate the heat map and the location map with respect to all of the joints j∈1 . . . J. Referring to FIG. 10, the prediction model 900 may use, for example, blocks till block 12 of MobileNetV2 model as the backbone network and may additionally include deep CNN layers. The prediction model 900 may acquire a clear clue for estimating a root-relative location map by adding a feature corresponding to a bone length (BL) to the prediction model 900. For example, the feature corresponding to BL may be represented as the following Equation 2.

$$BL_j = |\Delta X_j| + |\Delta Y_j| + |\Delta Z_j| \qquad \text{[Equation 2]}$$

In Equation 2, $^{\Delta}X_j$, $^{\Delta}Y_j$, and $^{\Delta}Z_j$ denote intermediate features in the prediction model 900. For efficient calculation, the feature corresponding to BL may be calculated using L1 distance instead of using L2 distance-based equation. The calculated features may be used to calculate a final output through combination with other intermediate features.

The prediction model 900 may use, for training, a cropped image based on a bounding box of the object. It may affect the performance of the prediction model 900 that is affected by a size of an image in runtime. To outperform a performance issue with maintaining real-time processing in a mobile device to which the prediction model 900 is mounted, the bounding box may be acquired based on, for example, keypoints (K) found in first several frames of a 2D heat map based on buffer area 0.2× vertical height 0.4× horizontal width and may perform continuous tracing using a previous frame having the momentum of 0.75. For normalization of scale, the cropped image based on the bounding box may be adjusted to have a size of 256×256 and may be used as an input to the prediction model 900.

Hereinafter, a loss function for an additional map based on teacher-student learning to train the prediction model 900 is described.

The loss function for training the prediction model 900 may include a heat map loss function ($L_{HM}$) and a location map loss function ($L_{LM}$). The heat map loss function ($L_Hm$) and the location map loss function ($L_{LM}$) may be represented as the following Equation 3 and Equation 4, respectively.

$$\mathcal{L}_{HM} = \frac{1}{J} \sum_{j=1}^{J} \{\alpha \|H_j - H_j^{GT}\|_2 + (1-\alpha)\|H_j - H_j^T\|_2\} \qquad \text{[Equation 3]}$$

$$\mathcal{L}_{LM} = \sum_{j=1}^{J} \{\alpha \|H_j^{GT} \odot (L_j - L_j^{GT})\|_2 + (1-\alpha)\|H_j^{GT} \odot (L_j - L_j^T)\|_2\} \qquad \text{[Equation 4]}$$

Here, $H_j$ and $H_j^{GT}$ denote a heat map and a GT heat map of a $j^{th}$ joint estimated by the prediction model 900, that is, the student model, respectively. Also, $\odot$ denotes Hadamard product, $L_j$ denotes a location map of the $j^{th}$ joint estimated by the prediction model 900 and $L_j^{GT}$ denotes a GT location map of the $j^{th}$ joint. GT and T denote ground truth and a result of estimation by the teacher model 920, respectively. That is, $H_j^T$ and $L_j^T$ denote a heat map and a location map of the $j^{th}$ joint estimated by the teacher model 920, respectively. Also, α denotes a mixture element, that is, a mixture ratio between ground truth and a teacher model loss condition and may be set to, for example, 0.5. Teacher-student learning may be performed through the entire training process in each mini-batch. When training of the prediction model 900 is completed, the prediction model 900 that is the student model 900 trained with knowledge of the teacher model 920 may be mounted to the computer system 100, such as a mobile device, and may be used for 3D pose estimation of the object.

For example, when training the student model 900 to learn location information about a plurality of joints of an object included in the training 2D input image 910 in operation 820 of FIG. 8, the student model 900 may be trained using a first loss function ($L_{HM}$) that is calculated based on a difference between a first heat map ($H_j$) for each of the plurality of joints estimated by the student model 900 and a second heat map ($H_j^{GT}$) corresponding to ground truth for each corresponding joint and a difference between the first heat map ($H_j$) and a third heat map ($H_j^T$) for each joint estimated by the teacher model 920, and a second loss function ($L_{LM}$) that is calculated based on a difference between a first location map ($L_j$) for each joint estimated by the student model 900 and a second location map ($L_j^{GT}$) corresponding to ground truth for each corresponding joint and a difference between the first location map ($L_j$) and a third location map ($L_j^T$) for each joint estimated by the teacher model 920. Here, the difference between the first heat map ($H_j$) and the second heat map ($H_j^{GT}$) and the difference between the first heat map ($H_j$) and the third heat map ($H_j^T$) may be included in the first loss function ($L_{HM}$) as a predetermined (or, alternatively, desired) mixture ratio ($\alpha$:1−$\alpha$). Also, the difference between the first location map ($L_j$) and the second location map ($L_j^{GT}$) and the difference between the first location map ($L_j$) and the third location map ($L_j^T$) may be included in the second loss function ($L_{LM}$) as the same mixture ratio. The mixture ratio may be, for example, 0.5. Here, the mixture ratio associated with the first loss function ($L_{HM}$) and the mixture ratio associated with the second loss function ($L_{LM}$) may be set to differ from each other.

The location information about the joint estimated by the prediction model 900 may be postprocessed through the aforementioned postprocessing method. Further description related thereto is omitted.

The systems or apparatuses described above may be implemented using hardware components or a combination of hardware components and software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular, however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes, optical media such as CD-ROM and DVDs, magneto-optical media such as floptical disks, and hardware devices that are specially configured to store and perform program instructions, such as read-only memory (ROM), random access memory (RAM), flash memory, and the like. Examples of other media may include recording media and storage media managed by Appstore that distributes applications or a site, a server, and the like that supplies and distributes other various types of software. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A method of generating data for estimating a three-dimensional (3D) pose of an object included in an input image using a computer system, the method comprising:
acquiring, using the computer system, the input image including at least one moving object;
estimating, using the computer system, location information about each joint of a plurality of joints of the object included in the input image using a prediction model pretrained to estimate the location information about each of the plurality of joints of the object;
generating, using the computer system, animation data that represents a movement of the object based on the estimated location information; and
generating a virtual character that mimics the movement of the object by mapping the plurality of joints to the virtual character based on the animation data;
wherein the generated virtual character is arranged at a location of an output image output from a user terminal, the location being determined according to a manipulation by a user of the user terminal.

2. The method of claim 1, wherein
the prediction model is trained using a teacher model pretrained to estimate, from a desired training image, location information about a plurality of joints of an object included in the training image,
the prediction model is a further compressed model compared to the teacher model, and
the prediction model learns the location information about the plurality of joints of the object included in the input image by using the estimated location information about the plurality of joints of the object included in the input image through the teacher model for calculation of a loss function.

3. The method of claim 1, wherein
the estimating the location information comprises,
generating a heat map and a location map for each joint of the plurality of joints; and
estimating 3D coordinate information about each joint as the location information based on the heat map and the location map,
the heat map represents a likelihood that each joint is present at each pixel location in the heat map, and
the location map includes information that represents a location in an x-axial direction, information that represents a location in a y-axial direction, and information that represents a location in a z-axial direction for each joint.

4. The method of claim 1, further comprising:
determining erroneously estimated location information in the estimated location information; and
correcting the erroneously estimated location information.

5. The method of claim 3, further comprising:
determining whether a value on the heat map for each joint corresponding to the 3D coordinate information about each joint is less than a threshold;
determining that the 3D coordinate information is erroneously estimated in response to the value on the heat map corresponding to the 3D coordinate information being less than the threshold; and
correcting the 3D coordinate information that is determined to be erroneously estimated.

6. The method of claim 1, wherein
the estimated location information includes 3D coordinate information about each of the plurality of joints, and
the animation data includes 3D location information about each joint based on the 3D coordinate information and rotation information about each joint based on 3D coordinate information that is continuously estimated for each joint.

7. The method of claim 6, further comprising:
determining whether rotation information that represents an abnormal rotation state is present in the rotation information about each joint; and
correcting the rotation information determined to represent the abnormal rotation state.

8. The method of claim 7, wherein the determining comprises determining that the rotation information represents the abnormal rotation state in response to the rotation information about each joint being out of a range of a preset angle corresponding to a normal movement of the object.

9. The method of claim 1, further comprising:
calculating global location information that represents a global location of the object based on a focal distance of a camera used to capture the input image and specific location information estimated for at least one of the plurality of joints,
wherein a location movement of the object in the input image is estimated based on the global location information.

10. The method of claim 1, further comprising:
generating a confidence map associated with a plurality of objects included in the input image, the confidence map including vector information associated with each joint of a plurality of joints of each of the plurality of objects, and
wherein the estimating the location information comprises estimating the location information about each joint of the plurality of joints of each object to be distinguished from that of another object, among the plurality of objects, using the confidence map.

11. The method of claim 1, wherein
the generating the virtual character comprises generating a plurality of virtual characters that respectively mimic movements of a plurality of objects included in the input image by mapping a plurality of joints of each of the plurality of objects to each of the plurality of virtual characters based on the animation data, and
each of the generated plurality of virtual characters is arranged at a different location of an output image output from a user terminal.

12. The method of claim 1, wherein
the acquiring comprises a partial image that includes a single object among a plurality of objects in the input image, and
the estimating and the generating are performed in parallel or sequentially with respect to the partial image.

13. The method of claim 1, wherein
the generating the virtual character comprises generating a plurality of virtual characters that respectively mimic movements of a plurality of objects included in the input image by mapping a plurality of joints of each of the plurality of objects to a corresponding virtual character, and
each of the generated plurality of virtual characters is arranged at a location of the output image determined according to a manipulation by the user of the user terminal.

14. A non-transitory computer-readable record medium storing instructions that, when executed by the computer system, cause the computer system to perform the method of claim 1.

15. A computer system for generating data for estimating a three-dimensional (3D) pose of an object included in an input image, the computer system comprising:
at least one processor configured to execute computer-readable instruction,
wherein the at least one processor is configured to
acquire the input image including at least one moving object,
estimate location information about each joint of a plurality of joints of the object included in the input image using a prediction model pretrained to estimate the location information about each of the plurality of joints of the object,
generate animation data that represents a movement of the object based on the estimated location information, and
generate a virtual character that mimics the movement of the object by mapping the plurality of joints to the virtual character based on the animation data,
wherein the generated virtual character is arranged at a location of an output image output from a user terminal, the location being determined according to a manipulation by a user of the user terminal.

16. A method of building a prediction model for estimating a three-dimensional (3D) pose of an object included in an input image using a computer system, the method comprising:
training, using the computer system, a teacher model to estimate location information about a plurality of joints of a training object included in a training image;
training, using the computer system, a student model of the teacher model that is a further compressed model compared to the teacher model to learn location information about the plurality of joints of the object included in the training image based on the estimated location information about the plurality of joints of the object included in the training image through the teacher model; and
building, using the computer system, the trained student model as the prediction model for estimating the 3D pose of the object included in the input image.

17. The method of claim 16, wherein
the training the student model comprises training the student model using a first loss function and a second loss function,
the first loss function is calculated based on
a difference between a first heat map for each joint of the plurality of joints estimated by the student model and a second heat map corresponding to ground truth for each joint, and
a difference between the first heat map and a third heat map for each joint estimated by the teacher model, and
the second loss function is calculated based on
a difference between a first location map for each joint estimated by the student model and a second location map corresponding to ground truth for each joint, and
a difference between the first location map and a third location map for each joint estimated by the teacher model.

18. The method of claim 17, wherein
the difference between the first heat map and the second heat map and the difference between the first heat map and the third heat map are included in the first loss function with a first mixture ratio, and
the difference between the first location map and the second location map and the difference between the first location map and the third location map are included in the second loss function with a second mixture ratio.

* * * * *